Patented Sept. 7, 1943

2,328,922

UNITED STATES PATENT OFFICE 2,328,922

PROCESS OF PREPARING VINYL ALCOHOL-METHACRYLIC ESTER COPOLYMERS

Harry T. Neher, Bristol, and Edwin H. Kroeker, East Oak Lane, Pa., assignors to Röhm & Haas Company, Philadelphia, Pa.

No Drawing. Application June 13, 1939, Serial No. 278,898

6 Claims. (Cl. 260—84)

This invention relates to a process of preparing copolymers of vinyl alcohol and esters of methacrylic acid.

It is known that polymerized vinyl esters, such as polyvinyl acetate, can be hydrolyzed to polyvinyl alcohol and that polyacrylic esters can be hydrolyzed to polyacrylic acid. Both of these hydrolyses can be carried to completion or stopped at an intermediate point whereby products are obtained which in the first case are copolymers of vinyl alcohol and vinyl esters, and in the second, copolymers of acrylic acid and acrylic esters. It has also been proposed to saponify copolymers of vinyl esters and acrylic esters so that the acid radical of the vinyl ester and the alcohol radical of the acrylic ester are split off leaving a copolymer of vinyl alcohol and acrylic acid, and then subjecting this product to conditions under which lactone formation occurs.

In copending application Serial No. 278,899, filed on even date herewith, now United States Patent No. 2,290,600, July 21, 1942, it is shown that new and useful products are obtainable from copolymers of vinyl alcohol and acrylic or methacrylic esters by converting the vinyl ester units of the copolymer to vinyl alcohol units under conditions which do not convert the acrylic or methacrylic ester units to acrylic or methacrylic acid units. The process for effecting this result described and claimed in the said copending application, is an alcoholysis reaction preferably carried out in the presence of an alcohol corresponding to the alcohol groups of the acrylic or methacrylic ester units.

It has been further discovered that unlike the copolymers of vinyl esters and acrylic esters, copolymers of vinyl esters and methacrylic esters may be hydrolyzed to copolymers of vinyl alcohol and methacrylic esters. When copolymers of vinyl esters and acrylic esters are subjected to hydrolysis treatments both the vinyl ester units and the acrylic ester units are hydrolyzed. On completion of the reaction the product obtained is a copolymer of vinyl alcohol and acrylic acid and at all intermediate stages of reaction both vinyl alcohol and acrylic acid units are present. When copolymers of vinyl esters and methacrylic esters, however, are subject to hydrolysis treatments we have found that only the vinyl ester units are hydrolyzed. This is quite surprising for it is known that methacrylic esters themselves hydrolyze as readily as acrylic esters and one of the known methods of determining the purity of methacrylic esters is to determine the saponification number of a sample.

Through this discovery it is made possible to prepare true copolymers of vinyl alcohol and methacrylic esters by a simple hydrolysis of a copolymer of a vinyl ester and a methacrylic ester. The hydrolysis may be carried out in either alkaline or acid medium. When the hydrolysis is effected in alkaline medium the alkali is consumed in the reaction by forming a salt with the acid derived from the vinyl ester. Any desired degree of partial hydrolysis of the vinyl ester units of the copolymer can therefore be controlled by limiting the amount of alkali used. Likewise the degree of hydrolysis may be estimated by determining the amount of alkali consumed. When the copolymers are hydrolyzed in the presence of more alkali than is needed to completely hydrolyze the vinyl ester units, the amount of alkali consumed reaches a definite limit which is unchanged by prolonged treatment. This limit is approximately that of the theoretical for complete hydrolysis of all of the vinyl ester groups in the copolymer. For example, an ethyl methacrylate-vinyl acetate copolymer containing approximately 21% vinyl acetate was dissolved and kept at 80° C. in the presence of excess sodium hydroxide for a total of 24 hours. After one hour, the amount of alkali consumed was measured by back titration. This was repeated at the end of 24 hours. The amount of alkali consumed at the end of one hour indicated that 21.2% of the original polymer had been hydrolyzed. At the end of 24 hours this figure increased to only 21.8%. Under the same conditions a 100% vinyl acetate polymer is completely hydrolyzed in about 15 minutes and a 100% ethyl methacrylate polymer less than 1% in two hours.

It is generally preferable to use sodium hydroxide for the alkaline hydrolysis although other alkaline substances such as potassium hydroxide, trisodium phosphate or quaternary ammonium hydroxides may be used with good results. Since the speed of hydrolysis is accelerated by heat, it is generally preferable to run it at somewhat elevated temperatures. At temperatures between 60° C. and 100° C. the hydrolysis is usually complete within an hour. Water miscible solvents are preferred, since they permit easy isolation of the polymer by precipitation through the addition of water. Suitable solvents of this class are ethanol, n-propanol, isopropanol, tertiary butanol, cellosolve, and dioxane. It is generally desirable to acidify the hydrolysis mixture before isolating the polymer. Unless this is done, the addition of water may cause the polymer to come out of solution as an emulsion difficult to coagulate. The polymers usually separate from acid solutions as coarse granules which are readily removed by filtration.

The hydrolysis with acid catalysts proceeds much more slowly than with alkali and it is more difficult to completely hydrolyze the vinyl ester units. Reaction times of 18 to 24 hours at temperatures of 80° to 100° C. have generally been found necessary with strong acids such as sulfuric, hydrochloric, or p-toluene sulfonic acids. Weaker acids are less effective.

Because of the speed with which the hydrolysis takes place and the ease of estimating the extent of the reaction, the alkaline hydrolysis is generally preferred. However, alkali has the disadvantage that its use introduced inorganic salts (e. g. sodium acetate, sodium sulfate) into the reaction mixture. Unless these are thoroughly removed by careful washing, or reprecipitation of the hydrolyzed polymer, they are likely to impart to it a certain haziness. For this reason, it is sometimes necessary to resort to acid hydrolysis when polymers of high optical clarity are desired.

With either acid or alkali as catalysts, it is highly desirable that the hydrolysis solution contain an appreciable amount of water, since under near anhydrous conditions, some modification of the methacrylic ester part of the polymer may take place through alcoholysis.

By varying the ratio and kind of esters used in preparing the copolymers, it is possible to prepare suitable polymers of widely varying properties. Suitable vinyl esters include vinyl acetate, vinyl chloroacetate, vinyl butyrate, vinyl isobutyrate, and vinyl stearate. Suitable methacrylic esters include the methyl, ethyl, n-propyl, n-butyl, isobutyl, sec. butyl, n-amyl, n-hexyl, 2-ethyl butyl, capryl, 2-ethyl hexyl, lauryl, cetyl, octadecyl, β-chloroethyl, β-ethoxyethyl, cyclohexyl and benzyl esters.

Since the acid group is removed from the vinyl ester during hydrolysis of the copolymer, it is generally preferable to use the simplest and most readily available vinyl ester; i. e. vinyl acetate. However, in cases where the hydrolysis of the vinyl ester is not carried to completion, it may be desirable for certain purposes to use a different vinyl ester in preparing the copolymer; e. g. vinyl butyrate or vinyl stearate. In such cases, the influence of the unconverted vinyl ester on the properties of the hydrolyzed polymer is roughly proportional to the amount present. The influence of the vinyl alcohol in the hydrolyzed polymers is generally to toughen them and to make them less thermoplastic and, in the case of copolymers of the higher methacrylates, to harden them. As the proportion of vinyl alcohol increases, the polymers generally become less soluble in organic solvents and their water absorption increases. Polymers containing as little as 3% by weight of vinyl alcohol units are substantially tougher than the untreated copolymers or the corresponding 100% methacrylic ester polymer. Preferably the total number of vinyl alcohol units in the polymer is kept below 50% and for most purposes within the range of from 20% to 2%. In every case, the hydrolyzed polymers were very much superior to the corresponding unhydrolyzed polymer with respect to their adhesion to vitreous surfaces.

The properties of the hydrolyzed copolymers are also influenced by the kind of methacrylic ester present. The lower esters, especially methyl, ethyl, isopropyl, or isobutyl, give hard, tough polymers. Those of the higher methacrylates become increasingly softer, the extent depending on the amount as well as the kind of ester present. To a limited extent, the properties of the polymers are also influenced by their molecular weight as measured by viscosity.

In the preparation of the copolymer of vinyl ester and methacrylic ester it is desirable to remove as far as possible any unpolymerized vinyl ester. Otherwise colored bodies may be formed due to the decomposition of the unpolymerized vinyl ester during the hydrolysis step. A convenient method of providing for the easy removal of unpolymerized vinyl ester is to copolymerize the vinyl ester and methacrylic ester in a water miscible organic solvent such as alcohols and ketones. The polymer may then be recovered substantially free from monomers and in a convenient form for handling by agitating the polymerization solution and slowly adding water. The viscosity of the mixture gradually increases until finally the dough-like mass obtained "breaks" whereupon the polymer separates from the solvent in the form of fine granules. The "break" generally occurs before the amount of water added exceeds 25% of the amount of solvent present. The monomers remain in the solvent from which the polymer is readily removed as by centrifuging or filtering. By washing and air drying the last traces of monomer may be removed from the polymer but usually this is not necessary. The polymer may then be dissolved in a water miscible organic solvent and subjected to a hydrolysis as above described.

*Example 1.*—A mixture of 1800 parts ethyl methacrylate, 600 parts vinyl acetate, and 1 part benzoyl peroxide was added over a 2-hour period to a refluxing mixture of 1920 parts of tertiary butanol and 480 parts cellosolve. Five hours after and again 18 hours after completion of the monomer addition, 0.4 part benzoyl peroxide was added. After a total of 24 hours' heating, the viscous, colorless solution was diluted with an equal volume of acetone. The addition of 1600 parts water, with vigorous agitation, caused the viscous mass to gradually thicken until it finally reached a highly viscous, non-adhesive stage. The further addition of 200 parts water broke the dough-like mass and precipitated the polymer as small granules which were readily filtered from the homogeneous liquid phase containing the water, solvent, and unpolymerized monomers. The granules were washed with water and dried thorough, giving 1800 parts of dried polymer.

Twenty parts of this polymer was dissolved in 80 parts constant boiling (91%) isopropanol. The solution was stirred and warmed to 80°. Enough 4NNaOH was then added to hydrolize 25% of the weight of the polymer, calculated as vinyl acetate. After one hour, the excess alkali was titrated with 4NH₂SO₄. The amount of alkali consumed by the polymer corresponded to 11.5% vinyl acetate in the original polymer. After titrating the excess alkali, the solution was made acid with an amount of 4NH₂SO₄ equivalent to the amount of alkali consumed, and the polymer precipitated by the slow addition of water. The polymer was filtered, washed and dried. Eighteen parts of dried polymer was thus obtained. The polymer was soluble in ethylene dichloride, acetone, ethyl acetate and benzene.

It was insoluble in ether and petroleum hydrocarbons. A film of the polymer (prepared from ethylene dichloride solution) was slightly cloudy, hard and tough. A film containing 25% dibutyl sebacate as plasticizer was noticeably harder and tougher than a corresponding film from the unhydrolyzed polymer. The film of the hydrolyzed polymer showed excellent adhesion to glass; whereas, the adhesion of the unhydrolyzed polymer was very poor. The cloudiness observed in the polymer was largely eliminated by reprecipitating the polymer from acetone solution.

Example 2.—Eighteen parts of ethyl methacrylate:vinyl acetate copolymer (same as described in Example 1) was dissolved in 64 parts of constant boiling (91%) isopropanol. The solution was heated to gentle reflux with stirring, and 2.7 parts conc. $H_2SO_4$ in 3.5 parts water added. Stirring was discontinued as soon as the mixture was homogeneous and the solution was kept at gentle reflux (81–83°) for 24 hours. The polymer was precipitated from the hot solution by the slow addition of water with vigorous agitation, filtered, washed, and dried. It was reprecipitated from isopropanol to remove traces of acid. The dried, reprecipitated polymer amounted to 16 parts. It was soluble in acetone, ethyl acetate, ethylene dichloride, benzene and toluene. Films prepared from solutions of the polymer were clear, colorless, and were tougher than films of the unhydrolyzed polymer. Except for their greater clarity, films prepared from the acid-hydrolyzed polymer were generally indistinguishable from those prepared from the alkali-hydrolyzed polymer.

Example 3.—A mixture of 2040 g. ethyl methacrylate, 360 g. vinyl acetate, and 1.2 g. benzoyl peroxide was added over a 2-hour period to 2400 g. refluxing 95% ethanol. Five hours after the end of the addition, 0.5 g. benzoyl peroxide was added and the heating continued for a total of 20 hours. The very viscous, colorless mass was diluted with 3600 g. acetone and the polymer precipitated from the solvent and unpolymerized monomer by the addition of water, as described in Example 1. After washing and drying, the polymer weighed 1940 g. The vinyl acetate content of the polymer was 5.7%, calculated from the alkali consumption value.

A solution of 1800 g. of the above dried polymer in 6400 g. constant boiling (91%) isopropanol, was heated to gentle reflux with stirring, and 105 cc. of 4NNaOH added (equivalent to 2% vinyl acetate in the polymer). The solution was kept at 80–82° for ½ hour, after which the solution was only faintly alkaline. The hot solution was stirred vigorously while 6500 g. water was slowly added. The mixture thickened and then dispersed again to give a fluid, stable, colloidal suspension. The addition of 80 cc. glacial acetic acid in 80 cc. water broke the suspension and the polymer precipitated as fine granules. The polymer was removed by filtration, washed by suspension in 4000 g. water, then filtered and dried. Weight 1640 g. Films prepared from an ethylene dichloride solution of the polymer were clear and colorless. They were tougher and harder than films of the unhydrolyzed polymer. The adhesion to glass of the hydrolyzed polymer was excellent. Films containing 30% dibutyl sebacate as plasticizer were quite tough and flexible and showed excellent resistance to impact over a wide temperature range.

Example 4.—Two parts methyl methacrylate and three parts vinyl acetate were copolymerized according to the procedure described in Example 1. Twenty parts of this polymer was dissolved in 80 parts of a mixture of ethanol and acetone (1:1). This solution was heated to reflux, and enough 4NNaOH added to hydrolyze 70% of the polymer, calculated as vinyl acetate. After one hour, the excess alkali was titrated with $4NH_2SO_4$. The amount of alkali consumed during the reaction corresponded to 38.3% vinyl acetate in the original polymer. The hydrolysis solution was then made acidic with sulfuric acid and the polymer precipitated by the slow addition of water, after which the polymer was filtered, washed and dried. The dried polymer was a hard, tough, white solid, insoluble in ethylene dichloride, but soluble in acetone or a mixture of acetone and alcohol. Films of the polymer were somewhat cloudy.

Example 5.—Three parts n-butyl methacrylate and one part vinyl acetate were copolymerized according to the procedure described in Example 1. A 20% solution of the polymer in 95% ethanol was heated to reflux with excess alkali for one hour. The amount of alkali consumed, as determined by back titration, corresponded to 10.5% vinyl acetate in the original polymer. The polymer was isolated by precipitation with water, washed and dried. The polydrolyzed polymer was harder and tougher than the unhydrolyzed polymer. It was softer and more flexible than the hydrolyzed polymer described in Example 1. The polymer was soluble in ethylene dichloride.

Example 6.—Three parts isobutyl methacrylate and one part vinyl acetate were copolymerized, and the resulting polymer hydrolyzed with excess alkali, as described in Example 5. The alkali consumed corresponded to 10.6% vinyl acetate in the original polymer. The hydrolyzed polymer was distinctly harder than the corresponding one from n-butyl methacrylate described in Example 5, and was nearly as hard as the polymer from ethyl methacrylate described in Example 1.

Example 7.—Three parts n-propyl methacrylate and one part vinyl acetate were polymerized and then hydrolyzed as described in Example 5. The alkali consumed corresponded to 12.0% vinyl acetate in the original polymer. The hydrolyzed polymer was softer than the corresponding one from ethyl methacrylate (Example 1) or isobutyl methacrylate (Example 6) and was harder than the polymer from n-butyl methacrylate (Example 5).

Example 8.—A mixture of three parts ethyl methacrylate and one part vinyl acetate containing 0.05% benzoyl peroxide was polymerized in an equal weight of benzene according to the procedure described in Example 1. Benzene and unpolymerized monomer were removed by steam distillation. The dried polymer amounted to 2.8 parts. A 20% solution of the polymer in 91% isopropanol was stirred for an hour at 80° with enough 4NKOH to hydrolyze 30% of the polymer, calculated as vinyl acetate. The amount of alkali actually consumed, determined by back titration with $4NH_2SO_4$, corresponded to 8.3% vinyl acetate. The polymer was isolated in the usual manner. It was similar in its properties to the hydrolyzed polymer described in Example 1.

Example 9.—Forty parts of a copolymer of ethyl methacrylate:vinyl acetate similar to the one described in Example 1 was dissolved in 160 parts 91% isopropanol. A. One-half of this solution was heated with one part conc. $H_2SO_4$ for 6 hours at 80°, and the polymer was isolated, washed and dried as described in Example 2.

B. The other half of the solution was heated with 3 parts conc. $H_2SO_4$ for 26 hours at 80° and the polymer isolated as described before. The vinyl acetate content of the original polymer was 11.0% (by alkali consumption). The vinyl acetate of the polymer obtained by treatment A was 10.3%; that of the polymer from treatment B was 8.7%. The A polymer thus had 0.7% of the vinyl acetate converted to vinyl alcohol; whereas, the B polymer had 2.3% so converted.

*Example 10.*—An emulsion prepared from 9 parts ethyl methacrylate, 1 part vinyl acetate, 0.01 part sulfonated castor oil, 0.1 part potassium persulfate, and 20 parts water, was added over a period of one hour to 30 parts water at 95°, with stirring. After further stirring at 95° for two hours, refluxing ceased. The emulsion of polymer was cooled and the polymer coagulated by the addition of a small amount of sulfuric acid. The yield of polymer was nearly quantitative. The polymer was dissolved in five times its weight of 91% isopropanol and heated with 10% (calculated on the weight of polymer) of conc. $H_2SO_4$ for 25 hours at 80°. The polymer was isolated in the usual manner. The polymer was swelled by, but did not dissolve in ethylene dichloride. The vinyl acetate content of the original polymer was 10.9% by alkali consumption.

*Example 11.*—A mixture of 3 parts cetyl methacrylate and 2 parts vinyl acetate containing 0.05% benzoyl peroxide, was polymerized in 5 parts benzene according to the procedure described in Example 1. The resulting copolymer was a soft, tacky, colorless mass. A solution of 8 parts of this polymer in 92 parts butyl carbitol was stirred for an hour at 100° with enough 4NNaOH to hydrolyze 52% of the polymer, calculated as vinyl acetate. The amount of alkali actually consumed, determined by back titration with 4NHCl, corresponded to 41.6% vinyl acetate. The polymer was isolated by diluting the solution with ice water and filtering the cold, hard, granular mass of polymer. The hydrolyzed polymer was distinctly harder and tougher than the unhydrolyzed polymer. It was insoluble in benzene, toluene, ethylene dichloride and alcohol.

As indicated in these examples the toughness of the new interpolymers and their adhesiveness toward glass make them valuable as the strengthening layer of a shatterproof glass. For this purpose they either be milled into sheets and the sheets inserted between sheets of glass or they may be applied to sheets of glass in solution, the coating thereby obtained dried, and a second sheet of glass, which may or may not also be coated, pressed against the dried film.

The new interpolymers may also be used in coating compositions such as paints, enamels and lacquers, and as textile and leather finishing agents. For the latter purposes they may either be applied in solution or in aqueous emulsion. They may likewise be used in printer's inks and in other applications where a resinous binder for pigment is desired.

The harder copolymers such as those made with methyl and ethyl methacrylate find use in preparation of molded articles such as phonograph records, dentures, fancy containers of various kinds, umbrella handles, mirror and brush backs and handles, combs, etc. For these purposes they may be used alone or mixed with fillers, pigments or other coloring material or with other plastic compositions such as cellulose derivatives and synthetic resins of the phenol formaldehyde, urea formaldehyde, or polybasic organic acid-polyhydric alcohol type. For the preparation of such articles the copolymers may be prepared either in the form of molding powders or as sheets.

Wide variations in the copolymers are possible by the selection of particular methacrylic esters or mixtures thereof and the degree of alcoholysis but still further variations may be made by the addition of plasticizers or chemically reacting the copolymer with compounds known to react with alcohol groups. Thus the polyvinyl alcohol units of the copolymers may be condensed with various aldehydes such as formaldehyde and butyraldehyde, thereby forming acetal units. Or the polyvinyl alcohol units may be condensed with polybasic organic acids such as phthalic, sebacic and maleic acids, or with mixtures of these acids and monobasic acids such as the higher fatty acids and acid reacting natural resins such as rosin. Similarly valuable products are obtained by reacting urea and formaldehyde in the absence of substantial amounts of water but in the presence of the new copolymers. There is thereby obtained a unitary reaction product that is not the same as the mixture of urea formaldehyde resin and copolymer.

We claim:

1. A process for the preparation of a copolymer of vinyl alcohol and a methacrylic ester which comprises copolymerizing a vinyl ester and a methacrylic ester in a water miscible organic solvent, precipitating the copolymer from the resulting solution by adding water, separating the copolymer, and treating the copoymer in an organic solvent containing water and a hydrolysis catalyst to hydrolyze the vinyl ester units.

2. A process for the preparation of a copolymer of vinyl alcohol and a methacrylic ester which comprises copolymerizing a vinyl ester and a methacrylic ester in a water miscible organic solvent, precipitating the copolymer from the resulting solution by adding water, separating copolymer and aqueous solution, dissolving the copolymer in a water miscible organic solvent, adding a strong base and a small amount of water to the solution and heating to from 60° to 100° C.

3. A process for the preparation of a copolymer of vinyl alcohol and a methacrylic ester which comprises copolymerizing a vinyl ester and a methacrylic ester in a water miscible organic solvent, precipitating the copolymer from the resulting solution by adding water, separating copolymer from solvent and water, treating the copolymer in an organic solvent containing water and an alkaline hydrolysis catalyst to hydrolyze the vinyl ester units, acidifying the solution and precipitating the vinyl alcohol-methacrylic ester copolymer by the addition of water.

4. A process for preparing polymeric products having hydroxyl groups on vinyl units of a copolymer of a vinyl ester and a methacrylic ester, which comprises copolymerizing a vinyl ester and a methacrylic ester in a water-miscible organic solvent to form a solution containing said polymer, mixing said solution with water to precipitate the copolymer, separating the copolymer, and heating it in an organic solvent with water and a hydrolysis catalyst.

5. A process for preparing polymeric products having hydroxyl groups on vinyl units of a copolymer of a vinyl ester and a methacrylic ester, which comprises copolymerizing a vinyl ester and a methacrylic ester in a water-miscible, organic solvent, mixing the solvent and copoylmer with water, separating copolymer from aqueous solvent, heating the separated copolymer in a water-miscible, organic solvent with water and a base to hydrolyze vinyl ester units, acidifying the resulting solution, and adding water to precipitate a copolymer having hydroxyl groups on vinyl units.

6. A process for preparing polymeric products having hydroxyl groups on vinyl units of a copolymer of a vinyl acetate and a methacrylic ester, which comprises copolymerizing vinyl acetate and a methacrylic ester in a water-miscible, organic solvent, mixing the copolymer in said solvent with water to precipitate the copolymer, isolating the copolymer, heating the copolymer thus prepared at 60° C. to 100° C. in a water-miscible, organic solvent with sodium hydroxide and water to hydrolyze vinyl ester units, acidifying the resulting solution, and adding water to precipitate the hydrolyzed copolymer.

HARRY T. NEHER.
EDWIN H. KROEKER.